United States Patent
Segev et al.

(10) Patent No.: US 12,511,079 B1
(45) Date of Patent: Dec. 30, 2025

(54) CONVERTING DIX TO DIF USING HMB BUFFER MANAGEMENT

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/790,549

(22) Filed: Jul. 31, 2024

(51) Int. Cl.
*G06F 3/00* (2006.01)
*G06F 3/06* (2006.01)

(52) U.S. Cl.
CPC .......... *G06F 3/0661* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | |
|---|---|---|
| 7,664,889 B2 | 2/2010 | Vemula et al. |
| 11,604,746 B2 | 3/2023 | Slaight et al. |
| 2012/0221533 A1* | 8/2012 | Burness .............. G06F 11/1076 707/690 |
| 2017/0269858 A1 | 9/2017 | Nimmagadda |
| 2023/0393738 A1 | 12/2023 | Segev et al. |
| 2024/0020196 A1 | 1/2024 | Kim |

* cited by examiner

*Primary Examiner* — Midys Rojas
(74) *Attorney, Agent, or Firm* — Patterson + Sheridan, LLP

(57) ABSTRACT

Identical address mapping for data and metadata can be used to support either data integrity extension (DIX) format or data integrity field (DIF) format. To do so, the data storage device is responsible for generating and maintaining scatter gather lists (SGLs). The data storage device can maintain either a DIX format or a DIF format in a host memory buffer (HMB) and then convert from DIX format to DIF format if the host device uses DIF format. Conversely, the data storage device can convert from DIF format to DIX format if the host device uses DIX format. Extending DIF capability to DIX capability, and vice versa, is possible without any changes to data flow.

20 Claims, 7 Drawing Sheets

CONVERTING DIX TO DIF USING HMB BUFFER MANAGEMENT

BACKGROUND OF THE DISCLOSURE

Field of the Disclosure

Embodiments of the present disclosure generally relate to supporting data integrity extension (DIX) format and data integrity field (DIF) format in a host memory buffer (HMB).

Description of the Related Art

There are two different formats for organizing data in buffers. One format is data integrity extension (DIX). The other format is data integrity field (DIF). DIX format involves organizing data and metadata separately. DIF format involves interleaving the metadata with the data. The metadata is an extension of the user data. The user data works in logical block addresses (LBAs) such as 512 bytes or 4K per LBA. The metadata is typically a multiple of 4 bytes starting at 8 bytes.

Typically, the host device can operate in one format and the data storage device needs to adapt to the host device's format. The interaction between the data storage device and the host device is challenging from a performance perspective.

Therefore, there is a need in the art for improved host device and data storage device interaction when using DIF and DIX formats.

SUMMARY OF THE DISCLOSURE

Identical address mapping for data and metadata can be used to support either data integrity extension (DIX) format or data integrity field (DIF) format. To do so, the data storage device is responsible for generating and maintaining scatter gather lists (SGLs). The data storage device can maintain either a DIX format or a DIF format in a host memory buffer (HMB) and then convert from DIX format to DIF format if the host device uses DIF format. Conversely, the data storage device can convert from DIF format to DIX format if the host device uses DIX format. Extending DIF capability to DIX capability, and vice versa, is possible without any changes to data flow.

In one embodiment, a data storage device comprises: a memory device; and a controller coupled to the memory device, wherein the controller is configured to: store data and metadata in a HMB, wherein the data and metadata are stored in DIF format; determine whether a host device operates in DIF format or DIX format; and deliver one or more SGLs to the host device corresponding to the format in which the host device operates.

In another embodiment, a data storage device comprises: a memory device; and a controller coupled to the memory device, wherein the controller is configured to: store data and metadata in a HMB, wherein the data and metadata are stored in DIX format; determine whether a host device operates in DIX format or DIF format; and deliver one or more SGLs to the host device corresponding to the format in which the host device operates.

In another embodiment, a data storage device comprises: means to store data; and a controller coupled to the means to store data, wherein the controller is configured to: write data in a HMB, wherein the data is written in either data DIX format or DIF format; and utilize identical address mapping for the data and report the data as either DIF or DIX to a host device, wherein the controller is configured to convert DIX format to DIF format or from DIF format to DIX format.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Identical address mapping for data and metadata can be used to support either data integrity extension (DIX) format or data integrity field (DIF) format. To do so, the data storage device is responsible for generating and maintaining scatter gather lists (SGLs). The data storage device can maintain either a DIX format or a DIF format in a host memory buffer (HMB) and then convert from DIX format to DIF format if the host device uses DIF format. Conversely, the data storage device can convert from DIF format to DIX format if the host device uses DIX format. Extending DIF capability to DIX capability, and vice versa, is possible without any changes to data flow.

Figure 1:
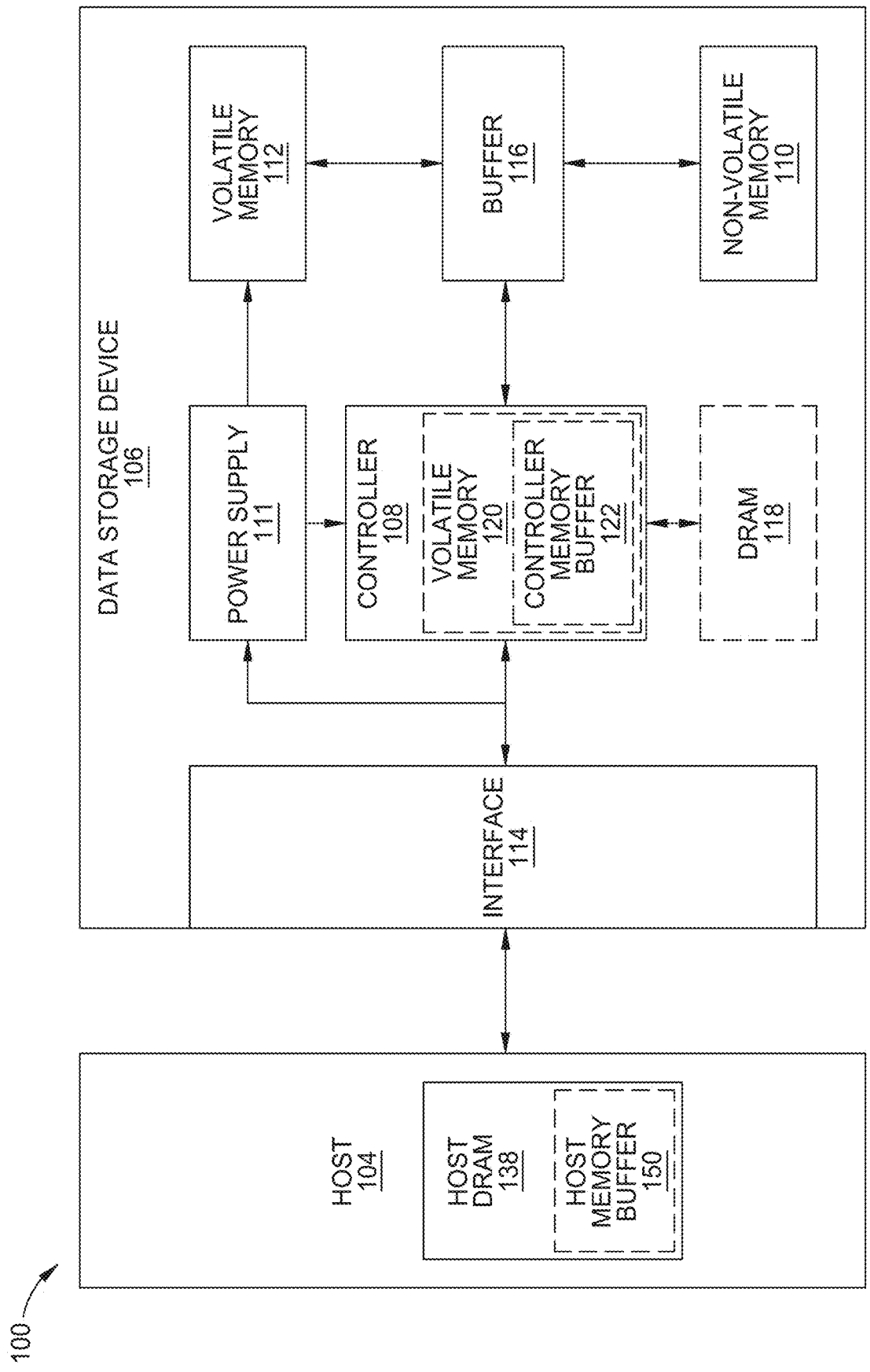
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more components of data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
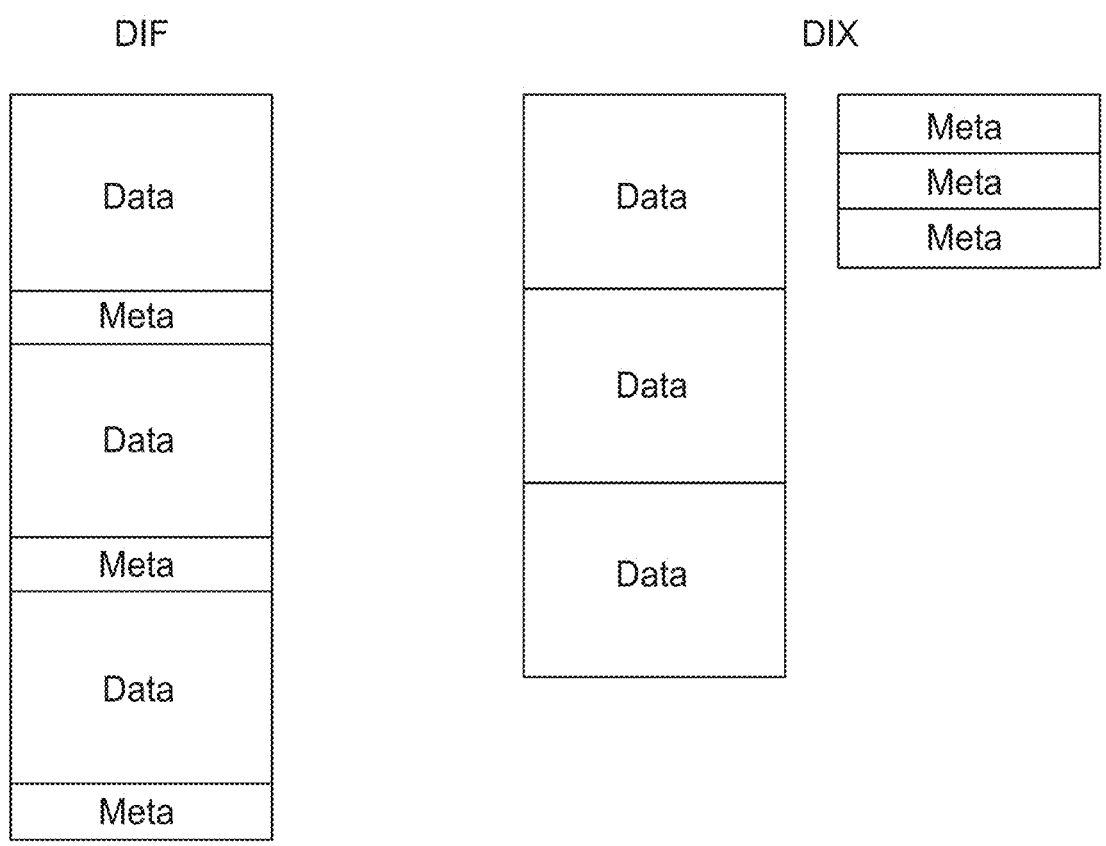
FIG. 2 is a schematic illustration of both DIF and DIX formats.

FIG. 2 is a schematic illustration 200 of both DIF and DIX formats. The DIF format is managed in a single list of pointers while the DIX format has two separate lists. Some devices support DIF formatting, such as when the data and metadata are stored on a same page of the memory device (e.g., NAND), while some host devices operate in DIX format.

In DIF format, the data is in a single buffer with one set of pointers to the data and the metadata. The data and metadata is not necessarily continuous or sequential as shown. The data and metadata are interleaved with one another in DIF format.

The DIX format has two pointers. One pointer is for the data and the other pointer is for the metadata. There can be multiple entries in each set. For example, for the data set, there can be multiple entries. Similarly, for the metadata set, there can be multiple entries. In one embodiment, the number of entries in the pointer for the data set is equal to the number of entries in the pointer for the metadata set. Basically, there is one head queue pointing to the data and one head queue pointing to the metadata.

When a data storage device operates in DIF format, but the host device operates in DIX format (or vice versa), some translation is necessary for processing read or write commands. In one example, the DIX information is placed into the DIX buffer in the host device, and then the data is read and after every LBA part of the DIX is pushed. Basically, metadata is read from the host device first and then the data is read. After 512 bytes for example, the data has been fetched. At that point, both the data and metadata have been fetched and are stored in a DIF buffer in the data storage device. For read commands, the opposite occurs. After sending all the data, the metadata is sent separately.

Figure 3:
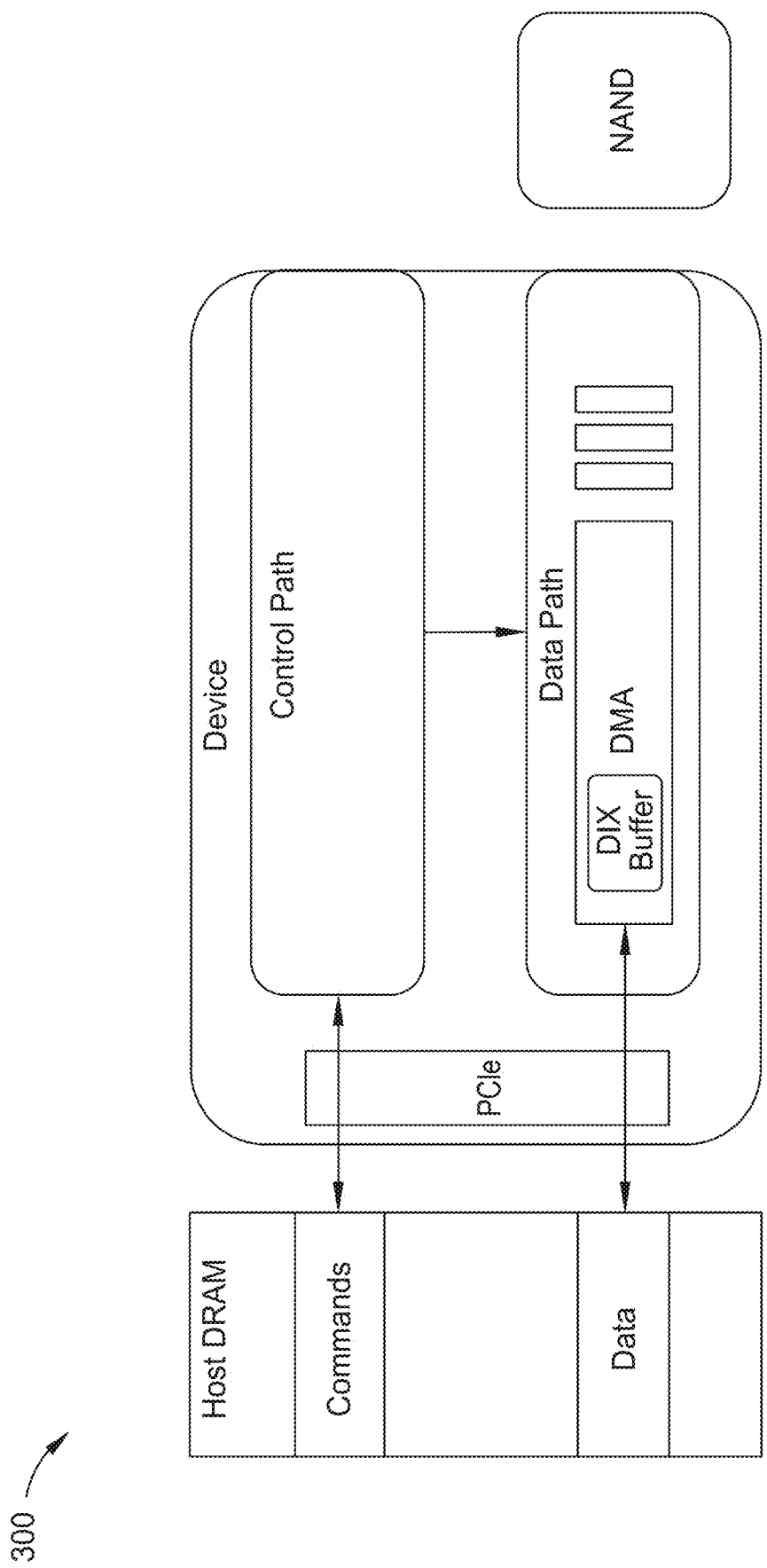
FIG. 3 is a schematic illustration of a system having a DIX buffer.

FIG. 3 is a schematic illustration 300 of a system having a DIX buffer. FIG. 3 shows the host DRAM with a range for commands and for data. FIG. 3 also shows the NAND from which the data is read from (or written to). FIG. 3 also shows the data storage device containing the PCIe interface, a control path (used for the command fetching and parsing), and the data path which gets triggered by the control path. The data path contains a few engines before finally reaching the DMA that is responsible for sending the data from local SRAM to the host DRAM.

To allow the device to work in DIF mode internally, and DIX mode externally (a similar mechanism is required if internally working in DIX and externally in DIF), a DIX-buffer is added. During write commands, when the data storage device reads data from the host device, the DMA works in accordance with the following flow. This flow assumes (for simplicity of example): LBS (LBA size) of 512 bytes; MDS (metadata size) of 8 bytes; MPS (Optimized TLP size) of 128 bytes. Each read from host device is expected to be of this size when possible to maintain required bandwidth; and NLB (Number of LBAs in the command) of 32 LBAs.

The flow is as follows: Repeat twice [NLB*MDS/MPS=32*8/128]; Fetch TLP worth of DIX information from host (128 bytes as example); Store DIX information in DIX buffer; Repeat 16 [MPS/MDS=128/8] (per LBA): Read (512 bytes) user data from host; and Pass LBA+relevant DIX info (8 bytes out of 128) to the rest of the data path engine.

The DIX buffer flow shows how the DIX data is pre-fetched, so the DIX data can be interleaved inside the data stream towards the other hardware (HW) engines. For the DIF flow, having to organize the data in a DIF towards the host device would in turn mean that each LBA which is currently fully aligned to 512 bytes (and PCIe TLP size), would now be 512+8 or 4k+16 (as examples), and are no longer aligned. This will complicate the DMA and will break down the TLP alignment.

The instant disclosure suggests a way to support DIF mode with minimal changes to the device. Previously, there were different data flows for DIF and DIX formats. As discussed herein, the data storage device can always use identical address mapping for the data and metadata and report the address mapping as either DIF format or DIX format. This is possible when the device is responsible for the SGL lists.

In SGL, every entry can be a different size. The entry can be 1 byte for example, but it is to be understood that the SGL can be any size. The SGL is much more scattered, and much more dynamic than the physical region page (PRP). The idea is that the data storage device decides where to place the data as opposed to the host device telling the data storage device where to place the data. The only location where the data storage device can decide the location of what to place the data is in HMB because the HMB is the storage area dedicated by the host device for the data storage device to use as the data storage device sees fit. Usually the HMB will have L2P tables as an example.

So the data storage device can control the locations in HMB and can thus decide to place data in HMB in either DIX format or DIF format without any input from the host device. If the HMB is in DIX format and the host device wants to work in DIF format, then the data storage device can generate a SGL list that looks like the list shown in FIG. 4.

Figure 4:
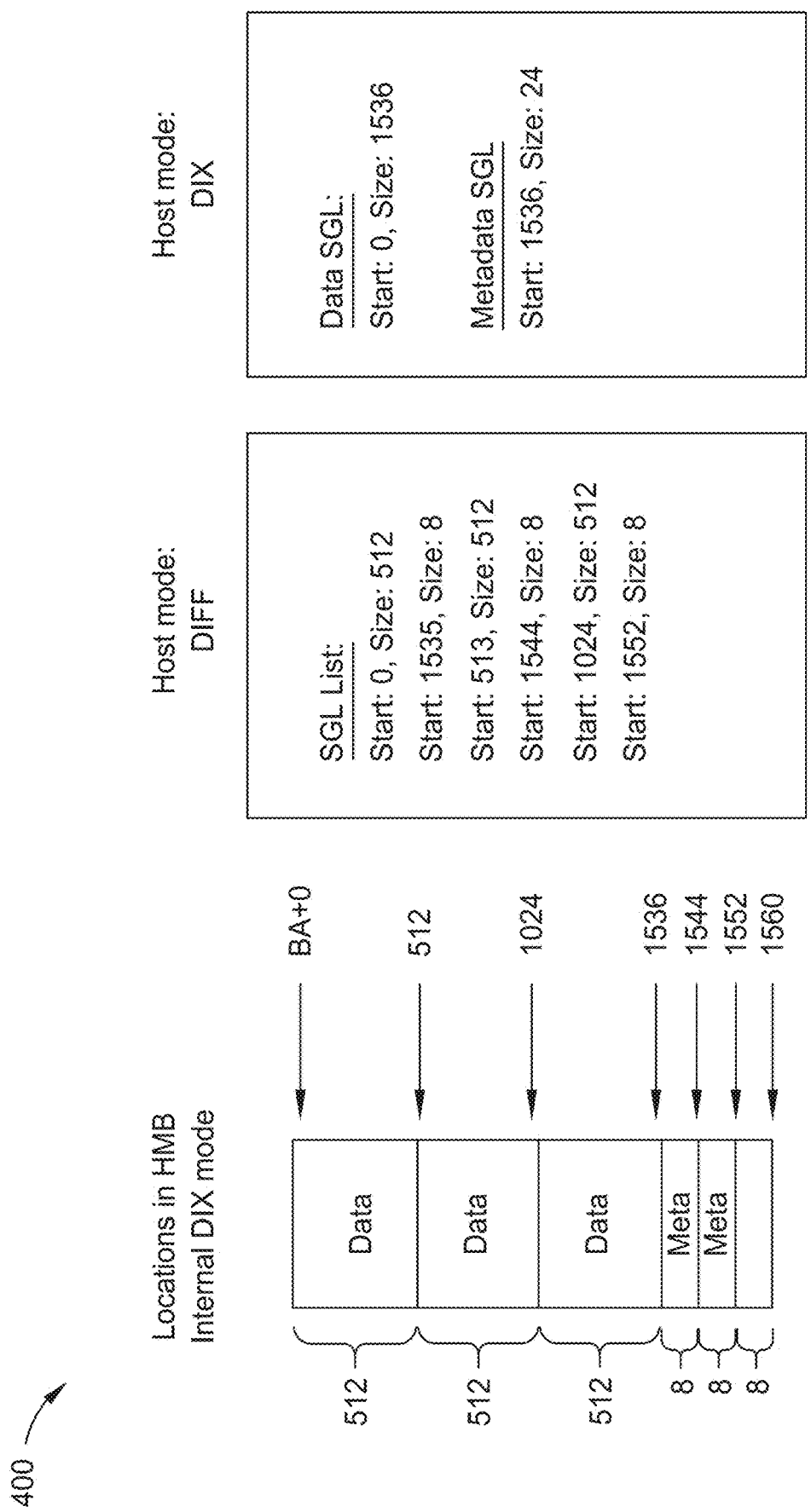
FIG. 4 is a schematic illustration of using internal DIX format.

FIG. 4 is a schematic illustration 400 of using internal DIX format. FIG. 4 shows the actual layout of data in the HMB memory, which is identical to both DIF and DIX modes. In this example, the data in the HMB is organized as DIX. This is used to simplify the DMA when it comes to TLP optimization (no need to break TLP towards the MAC based on local buffers breakdown). However, when the data storage device (i.e., controller of the data storage device) generates the SGL list of the command, the controller will either generate a six entry list (oftentimes referred to as a pointer or set), when the NS is formatted to work with DIF format, or two lists of one entry each when the NS is configured for DIX format.

So zero to 512 would be the first entry in the DIF SGL list which will be for data and then 1535 to 1543 will be the second entry, which will be for metadata. The list goes on and on alternating between data and metadata as shown in FIG. 4. If the host device operates in DIX mode, then there will be two lists, one list for the data SGL starting at 0 with a size of 1536 and a second list for the metadata starting at 1536 with a size of 24. By generating the SGL structure with the data storage device, the host device is tricked into working in DIX or DIF format while the data storage device operates in DIX format in FIG. 4.

Figure 5:
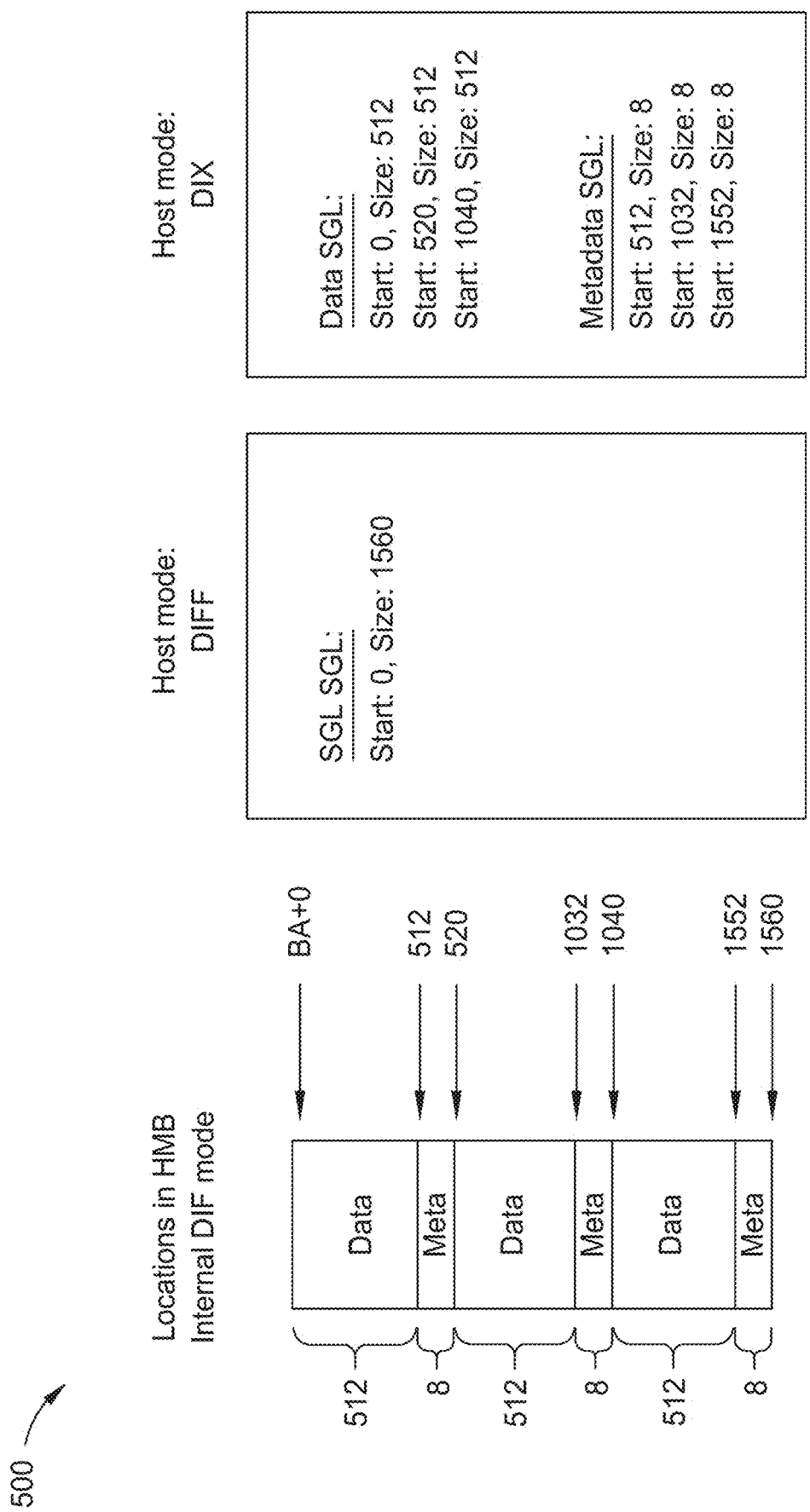
FIG. 5 is a schematic illustration of using internal DIF format.

FIG. 5 is a schematic illustration 500 of using internal DIF format. In this case, the data be arranged in the HMB in DIF layout. The SGL list for the DIX format will contain 2 list of 3 entries each, and the SGL list for the DIF format, will contain 1 entry. FIG. 5 shows the other way around, compared to FIG. 4, where the data storage device operates in DIF format and the host device can operate in either DIX or DIF format. The HMB operates in DIF format. If the host device works in DIF format, then there is one buffer starting at 0 with a size of 1560. If the host device works in DIX mode, then there are two lists, one for data and one for metadata.

Basically, when considering FIGS. 4 and 5, the host device can work in either DIF format or DIX format, and the data storage device can also operate in either DIF format or DIX format. Converting between formats is simple due to the fact that the data storage device creates the SGL because the data and metadata are in HMB and their location is controlled by the controller.

Figure 6:
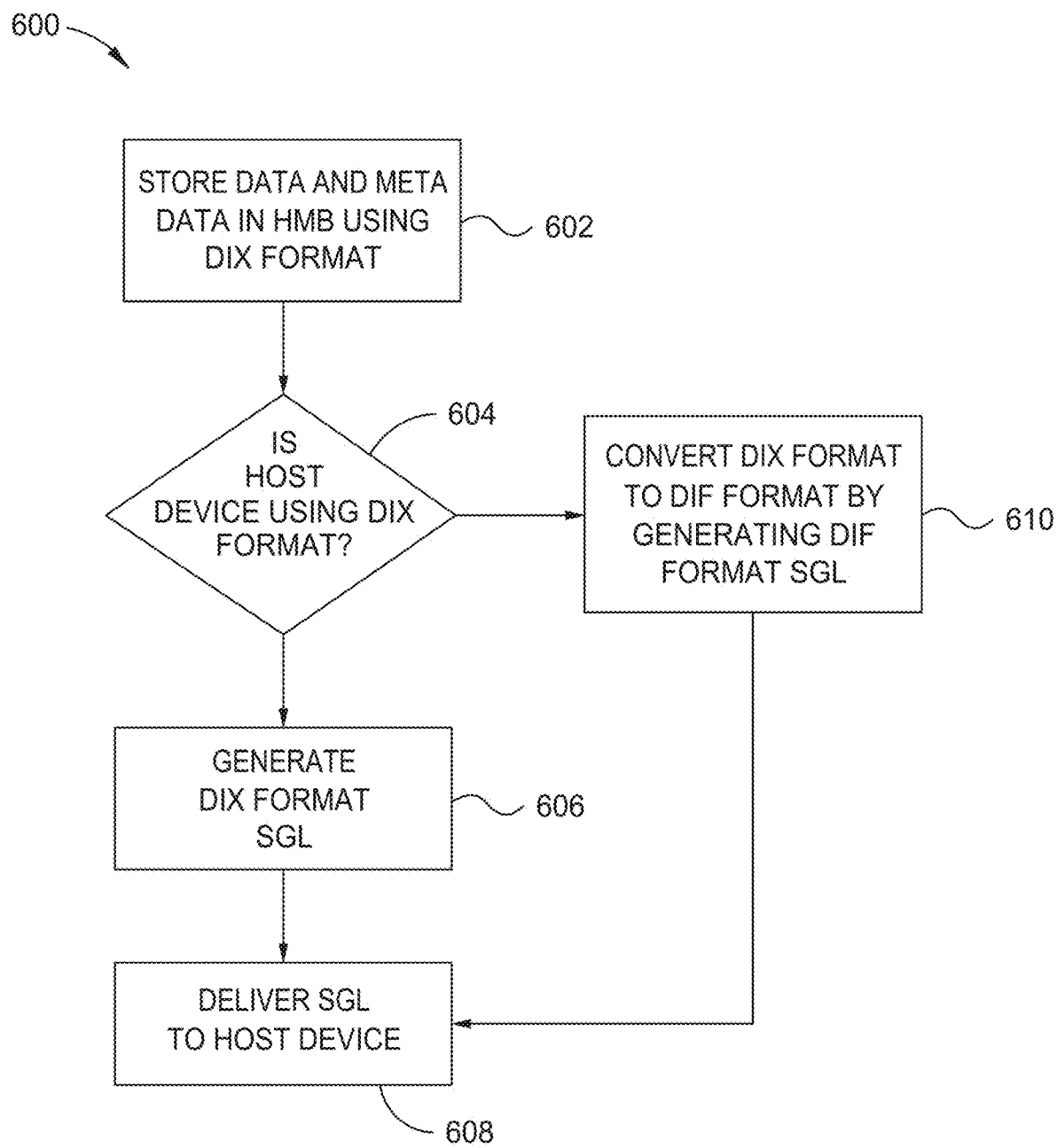
FIG. 6 is a flowchart illustrating using DIX format in HMB.

FIG. 6 is a flowchart 600 illustrating using DIX format in HMB. Initially, the data storage device decides to store data and metadata in HMB using DIX format at block 602. Thereafter, a determination is made regarding whether the host device is using DIX format at block 604. If the host device is using DIX format, then DIX format SGLs are generated at block 606 and the SGL is delivered to the host device at block 608. If the host device is not using DIX format, then the host device is using DIF format. As such, the DIX format is converted to DIF format by generating DIF format SGLs at block 610 and then delivering the SGL to the host device at block 608.

Figure 7:
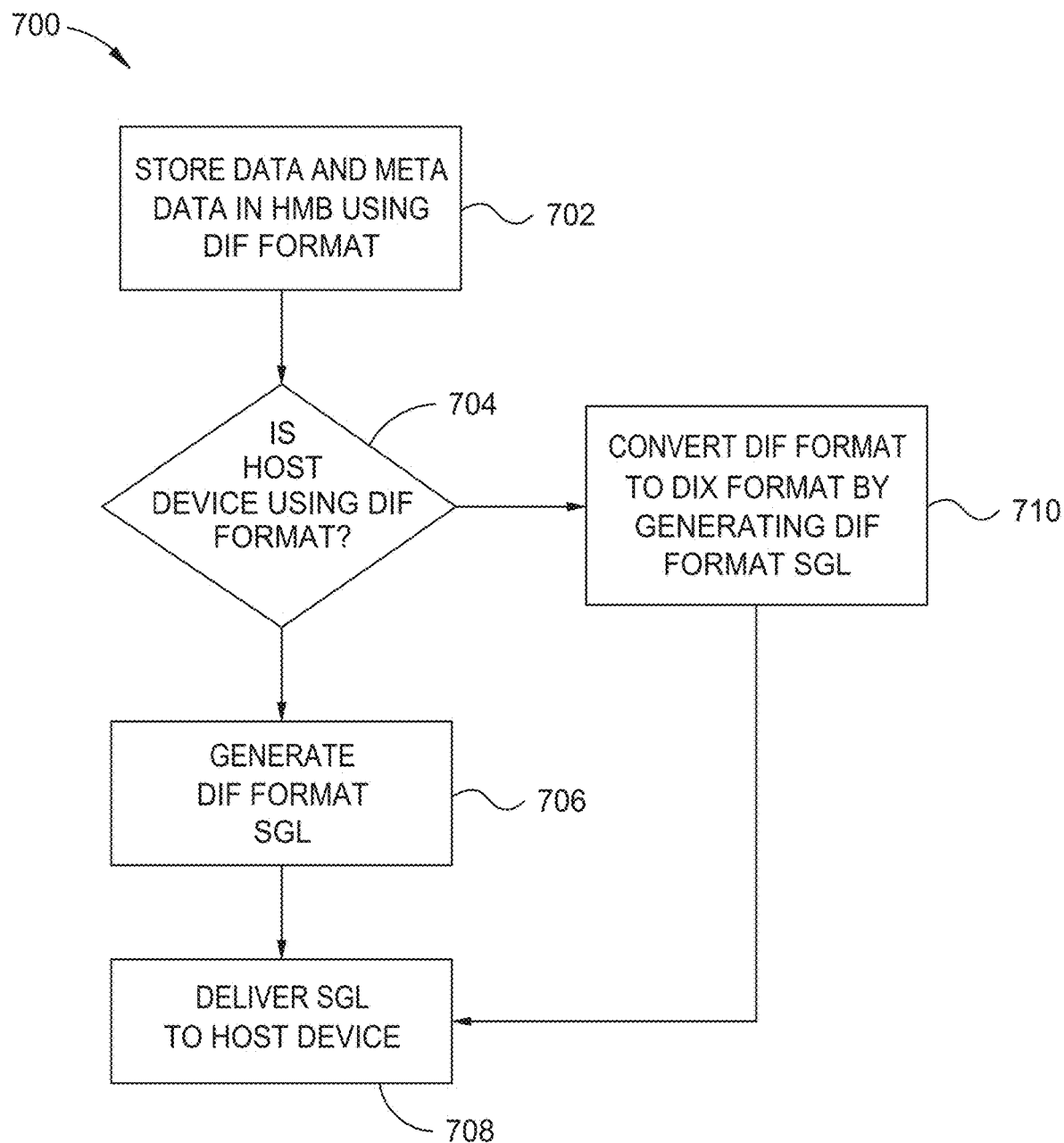
FIG. 7 is a flowchart illustrating using DIF format in HMB.

FIG. 7 is a flowchart 700 illustrating using DIF format in HMB. Initially, the data storage device decides to store data and metadata in HMB using DIF format at block 702. Thereafter, a determination is made regarding whether the host device is using DIF format at block 704. If the host device is using DIF format, then DIF format SGLs are generated at block 706 and the SGL is delivered to the host device at block 708. If the host device is not using DIF format, then the host device is using DIX format. As such, the DIF format is converted to DIX format by generating DIX format SGLs at block 710 and then delivering the SGL to the host device at block 708.

By allowing the data storage device to handle the buffer allocation of a read command's destination, the data storage device can support both DIF and DIX formats using the same data structure in the HMB which allows extending DIX capability to DIF capability with no changes to data flow.

In one embodiment, a data storage device comprises: a memory device; and a controller coupled to the memory device, wherein the controller is configured to: store data and metadata in a host memory buffer (HMB), wherein the data and metadata are stored in DIF format; determine whether a host device operates in DIFX format or DIX format; and deliver one or more scatter-gather lists (SGLs) to the host device corresponding to the format in which the host device operates. The controller is configured to convert the data and metadata from DIF format to DIX format. The delivering comprises delivering a data SGL and a separate and distinct metadata SGL to the host device. The data SGL has a plurality of data entries. The plurality of data entries are not sequential. The metadata SGL has a plurality of metadata entries. The plurality of metadata entries are not sequential. A first metadata entry of the plurality of metadata entries is sequential with a first data entry of the plurality of data entries. The data SGL and the metadata SGL are sequential and each comprise a single entry. The controller is configured to generate the SGL.

In another embodiment, a data storage device comprises: a memory device; and a controller coupled to the memory device, wherein the controller is configured to: store data and metadata in a host memory buffer (HMB), wherein the data and metadata are stored in DIX format; determine whether a host device operates in DIX format or DIF format; and deliver one or more scatter-gather lists (SGLs) to the host device corresponding to the format in which the host device operates. The controller is configured to convert the data and metadata from DIX format to DIF format. The delivering comprises delivering a single SGL that covers both data and metadata. The controller is configured to deliver a data SGL and a separate and distinct metadata SGL to the host device for the host device operating in the DIF format. The data SGL has a plurality of data entries and wherein the metadata SGL has a plurality of metadata entries. The plurality of data entries are not sequential and wherein the plurality of metadata entries are not sequential. A first data entry of the plurality of metadata entries and a first metadata entry are sequential.

In another embodiment, a data storage device comprises: means to store data; and a controller coupled to the means to store data, wherein the controller is configured to: write data in a host memory buffer (HMB), wherein the data is written in either data integrity extension (DIX) format or data integrity field (DIF) format; and utilize identical address mapping for the data and report the data as either DIF or DIX to a host device, wherein the controller is configured to convert DIX format to DIF format or from DIF format to DIX format. The controller is configured to generate at least one scatter gather list (SGL) for data and metadata. The generated at least one SGL comprises generating separate SGL lists for data and metadata.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   store data and metadata in a host memory buffer (HMB), wherein the data and metadata are stored in data integrity field (DIF) format;
   determine whether a host device operates in DIF format or data integrity extension (DIX) format; and
   deliver one or more scatter-gather lists (SGLs) to the host device corresponding to the format in which the host device operates.

2. The data storage device of claim 1, wherein the controller is configured to convert the data and metadata from DIF format to DIX format.

3. The data storage device of claim 1, wherein the delivering comprises delivering a data SGL and a separate and distinct metadata SGL to the host device.

4. The data storage device of claim 3, wherein the data SGL has a plurality of data entries.

5. The data storage device of claim 4, wherein the plurality of data entries are not sequential.

6. The data storage device of claim 5, wherein the metadata SGL has a plurality of metadata entries.

7. The data storage device of claim 6, wherein the plurality of metadata entries are not sequential.

8. The data storage device of claim 7, wherein a first metadata entry of the plurality of metadata entries is sequential with a first data entry of the plurality of data entries.

9. The data storage device of claim 3, wherein the data SGL and the metadata SGL are sequential and each comprise a single entry.

10. The data storage device of claim 1, wherein the controller is configured to generate the SGL.

11. A data storage device, comprising:
    a memory device; and
    a controller coupled to the memory device, wherein the controller is configured to:
    store data and metadata in a host memory buffer (HMB), wherein the data and metadata are stored in data integrity extension (DIX) format;
    determine whether a host device operates in DIX format or data integrity field (DIF) format; and
    deliver one or more scatter-gather lists (SGLs) to the host device corresponding to the format in which the host device operates.

12. The data storage device of claim 11, wherein the controller is configured to convert the data and metadata from DIX format to DIF format.

13. The data storage device of claim 11, wherein the delivering comprises delivering a single SGL that covers both data and metadata.

14. The data storage device of claim 11, wherein the controller is configured to deliver a data SGL and a separate and distinct metadata SGL to the host device for the host device operating in the DIF format.

15. The data storage device of claim 14, wherein the data SGL has a plurality of data entries and wherein the metadata SGL has a plurality of metadata entries.

16. The data storage device of claim 15, wherein the plurality of data entries are not sequential and wherein the plurality of metadata entries are not sequential.

17. The data storage device of claim 16, wherein a first data entry of the plurality of metadata entries and a first metadata entry are sequential.

18. A data storage device, comprising:
    means to store data; and
    a controller coupled to the means to store data, wherein the controller is configured to:
    write data in a host memory buffer (HMB), wherein the data is written in either data integrity extension (DIX) format or data integrity field (DIF) format; and
    utilize identical address mapping for the data and report the data as either DIF or DIX to a host device, wherein the controller is configured to convert DIX format to DIF format or from DIF format to DIX format.

19. The data storage device of claim 18, wherein the controller is configured to generate at least one scatter gather list (SGL) for data and metadata.

20. The data storage device of claim 19, wherein the generated at least one SGL comprises generating separate SGL lists for data and metadata.

* * * * *